United States Patent
Coulson

(10) Patent No.: US 6,941,423 B2
(45) Date of Patent: Sep. 6, 2005

(54) NON-VOLATILE MASS STORAGE CACHE COHERENCY APPARATUS

(75) Inventor: Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/740,633

(22) Filed: Dec. 22, 2003

(65) Prior Publication Data

US 2004/0162950 A1 Aug. 19, 2004

Related U.S. Application Data

(63) Continuation of application No. 09/669,770, filed on Sep. 26, 2000, now Pat. No. 6,725,342.

(51) Int. Cl.$^7$ .............................................. G06F 12/00
(52) U.S. Cl. ...................... 711/141; 711/135; 711/142; 711/143
(58) Field of Search ........................ 711/135, 141–144; 714/22; 713/300; 345/347

(56) References Cited

U.S. PATENT DOCUMENTS

| | | |
|---|---|---|
| 4,723,181 A | 2/1988 | Hickok |
| 4,908,793 A | 3/1990 | Yamagata et al. |
| 4,972,364 A | 11/1990 | Barrett et al. |
| 5,046,043 A | 9/1991 | Miller et al. |

(Continued)

FOREIGN PATENT DOCUMENTS

EP 0702305 3/1996

OTHER PUBLICATIONS

Ramtron Int'l. Corp.—"FRAM Technology", Jan. 1994, 2 pages.

NTIS, Dept. of the Navy, "Multi–Wire Cable to Coaxial Cable Transition Apparatus", ADD000450, Jan. 14, 1974, 8 pages.

RAMTRON Application Note "Replacing a Dallas Semiconductor DS1225 with FRAM.RTM. Memory", Feb. 1994, 2 pages.

(Continued)

*Primary Examiner*—Nasser Moazzami
(74) *Attorney, Agent, or Firm*—Kenyon & Kenyon

(57) ABSTRACT

Apparatus and methods relating to a cache coherency administrator. The cache coherency administrator can include a display to indicate a cache coherency status of a non-volatile cache.

16 Claims, 6 Drawing Sheets

U.S. PATENT DOCUMENTS

| | | | |
|---|---|---|---|
| 5,070,314 A | | 12/1991 | Decker |
| 5,133,060 A | | 7/1992 | Weber et al. |
| 5,197,895 A | | 3/1993 | Stupecky |
| 5,269,019 A | | 12/1993 | Peterson et al. |
| 5,274,799 A | | 12/1993 | Brant et al. |
| 5,347,428 A | | 9/1994 | Carson et al. |
| 5,353,430 A | | 10/1994 | Lautzenheiser |
| 5,442,752 A | | 8/1995 | Styczinski |
| 5,466,629 A | | 11/1995 | Mihara et al. |
| 5,499,337 A | | 3/1996 | Gordon |
| 5,519,831 A | | 5/1996 | Holzhammer |
| 5,526,482 A | | 6/1996 | Stallmo et al. |
| 5,542,066 A | | 7/1996 | Mattson et al. |
| 5,586,291 A | | 12/1996 | Lasker et al. |
| 5,615,353 A | | 3/1997 | Lautzenheiser |
| 5,636,355 A | | 6/1997 | Ramakrishnan et al. |
| 5,701,516 A | | 12/1997 | Cheng et al. |
| 5,764,945 A | | 6/1998 | Ballard |
| 5,787,296 A | | 7/1998 | Grimsrud et al. |
| 5,787,466 A | | 7/1998 | Berliner |
| 5,806,085 A | | 9/1998 | Berliner |
| 5,860,083 A | | 1/1999 | Sukegawa |
| 5,890,205 A | | 3/1999 | Grimsrud et al. |
| 5,918,244 A | | 6/1999 | Percival |
| 5,963,721 A | | 10/1999 | Shiell et al. |
| 6,012,140 A | | 1/2000 | Thomason |
| 6,023,713 A | | 2/2000 | Grimsrud et al. |
| 6,052,789 A | * | 4/2000 | Lin ............................ 713/300 |
| 6,072,490 A | | 6/2000 | Bates et al. |
| 6,101,574 A | | 8/2000 | Kumasawa et al. |
| 6,122,711 A | * | 9/2000 | Mackenthun et al. ........ 711/135 |
| 6,165,006 A | | 12/2000 | Yeh et al. |
| 6,175,160 B1 | | 1/2001 | Paniccia et al. |
| 6,178,479 B1 | | 1/2001 | Vishin |
| 6,208,273 B1 | | 3/2001 | Dye et al. |
| 6,263,405 B1 | | 7/2001 | Irie et al. |
| 6,295,577 B1 | | 9/2001 | Anderson et al. |
| 6,370,614 B1 | * | 4/2002 | Teoman et al. ............. 711/113 |
| 6,438,647 B1 | | 8/2002 | Nielson et al. |
| 6,725,342 B1 | | 4/2004 | Coulson |
| 6,785,767 B2 | | 8/2004 | Coulson |

OTHER PUBLICATIONS

News Release, "DPT's SmartCache IV RAID/Caching Kits Outperform Adaptec's SCSI Adapters in Independent Tests and Reviews", DPT, Aug. 1, 1996.

DPT's products and tech support "FAQ" web page from www.dpt.com as archived by web.archive.com on Jul. 15, 1997.

DPT brochure for Smart IV PM2144W PCI High Performance SCSI Adapter, Cache and RAID upgradable, undated, circa 1997.

Pulvari, "Ferroelectrics and Their Memory Applications", IRE Transactions–Component Parts, Mar. 1956, pp. 3–11.

Auciello et al, "The Physics of Ferroelectric Memories", Physics Today, Jul. 1998, pp. 22–27,.

Intel 430HXPCIset Design Guide, Jun. 1997, pp. 1–1 through 6–15.

Moazzami et al, "A Ferroelectric DRAM Cell for High Density NVRAMs", IEEE Electron Device Letters, vol. 11, No. 10, pp. 454–456, Oct. 1990.

Robertson, "Hyundai Enters Japanese–Dominated FeRAM Market", a service of Semiconductor Business News, CMP Media Inc., www.siliconstrategies.com; story posted Sep. 3, 1998.

RAMTRON Int'l. Corp., datasheet for FM1608, dated Dec. 7, 1999.

RAMTRON Int'l. Corp. datasheet for FM24C64, dated Dec. 7, 1999.

Merz & Anderson, "Ferroelectric Storage Devices", Bell Laboratories Record, Sep. 1955, pp. 335–337 and 339–342.

Hodges & Jackson, Analysis and Design of Digital Intergrated Circuits, McGraw–Hill, Inc., 1983, pp. 388–389.

Microsoft Press.RTM. Computer Dictionary, 2.sup.nd Edition, "nondestructive readout", 1994, p. 270.

Derwent–Acc–No. 2000–348269, document ID: RD 431135, Abstract, Mar. 10, 2000.

Related U.S. Appl. No. 09/745,550, filed Dec. 26, 2000.

Patent Abstracts of Japan vol. 18, No. 621, Nov. 25, 1994 and JP 06 236241 A (Sharp Corp.) Aug. 23, 1994, Sharp Corp.

Related U.S. Appl. No. 09/602,011, filed Jun. 23, 2000.
Related U.S. Appl. No. 09/602,010, filed Jun. 23, 2000.
Related U.S. Appl. No. 09/602,008, filed Jun. 23, 2000.
Related U.S. Appl. No. 09/602,009, filed Jun. 23, 2000.

Tanzawa et al, "A Compact On–Chip ECC for Low Cost Flash Memories" IEEE Journal of Solid State Circuits, IEEE Inc., New York, vol. 32, No. 5, pp. 662–668, May 1, 1997.

Intel, 82371FB (PIIX) and 82371SB (PIIX3) PCI ISA IDE Xcelerator data sheet, pp. 1–122, Apr. 1997.

Diefendorff, Keith, "Intel Tries Integrating Graphics", In–Stat MDR, Vo. 12, Issue 11 (from www.mdronline.com), Aug. 24, 1998.

Derowitsch, Rachel, "The Quiet Role of Chipsets", Smart Computing, vol. 9, Issue 8, pp. 70–72, Aug. 1998.

Data sheet—SGS–Thomson Microelectronics GSF32–16.times.16/90 32 MByte SIMM Flash Memory Module, pp. 1–4, Oct. 29, 1997.

Rosenberg, Jerry M., Dictionary of Computers, Information Processing & Telecommunications, 2.sup.nd Edition, p. 221, 1987.

White, Ron, How Computers Work, Chapter 11, "How a Disk Cache Works", pp. 71–73, Ziff–Davis Press, Emeryville, CA, 1993.

IBM Technical Disclosure Bulletin, vol. 25, No. 2, pp. 459–460, Optical/Magnetic Storage Disk System, Jul., 1982.

"Sun StorEdge A5200 Fibre Channel Array And Sun Enterprise 10000 Server Set New Milestones For I/O Speed And Performance," Sun Configuration Delivers 102.000 I/Os Per Second on Nine Terabytes of Data, Palo Alto, Jun. 29, 1999, pp. 1–3.

Webster's Unabridged Dictionary of the English Language, © 1989 by dilithium Press, Ltd., entry for sheath, p. 1312.

Webster's Ninth New Collegiate Dictionary, © 1986 by Merriam–Webster Inc., entry for matrix, p. 733.

* cited by examiner

NON-VOLATILE MASS STORAGE CACHE COHERENCY APPARATUS

CROSS-REFERENCE TO RELATED APPLICATION

This application is a continuation application that claims the benefit of U.S. patent application Ser. No. 09/669,770 (filed Sep. 26, 2000), now U.S. Pat. No. 6,725,342.

BACKGROUND OF THE INVENTION

A computer can store data both in a volatile memory and a non-volatile mass storage device. Examples of volatile memory include, but are not limited to, dynamic random access memory (DRAM), static random access memory (SRAM), Rambus dynamic random access memory (RDRAM), etc. Examples of a non-volatile mass storage device include, but are not limited to, a hard disk drive, a 3.5-inch diskette, a 5.25-inch floppy diskette, a ZIP® disk (e.g., manufactured by Iomega Corporation of Roy, Utah), a Jaz® disk (e.g., manufactured by Iomega Corporation), an LS-120 Superdisk (e.g., manufactured by Imation Corporation of Oakdale, Minn.), a rewritable Digital Versatile Disc (DVD-RAM), a Read/Write Compact Disk (CD-RW), a magnetic mass storage device, an optical mass storage device, a magneto-optical mass storage device, a holographic storage device, etc. Examples of data stored in a non-volatile memory of a computer include computer instructions (e.g., an operating system, one or more application programs, etc.) and data that is accessed by computer instructions.

When a volatile memory loses power, the data stored on the volatile memory is typically lost. Non-volatile mass storage devices, such as hard disk drives, typically do not lose the data stored thereon when the non-volatile mass storage device loses power (e.g., when power to the computer is turned off, due to a power outage, etc.). Non-volatile memory, however, generally has significantly greater access times for retrieval and storage of data as compared to volatile memory. Non-volatile memory is also typically less expensive than certain volatile memory such as DRAM, SRAM, RDRAM, etc.

In addition to volatile memory and non-volatile memory, a computer typically includes a processor that can perform operations based on instructions and data. Instructions and data to be operated on by the processor can be copied from the slower, non-volatile mass storage device (e.g., a hard disk drive, etc.) to the faster, volatile memory (e.g., a DRAM main memory, an SRAM cache, etc.) because the faster, volatile memory typically has a significantly lesser memory access time than the non-volatile mass storage device. Processor performance and computer performance can be enhanced when memory access times are reduced.

Because the memory access time for a non-volatile mass storage device (e.g., disk drive) is generally greater than the memory access time for the volatile memory (e.g., DRAM main memory, SRAM cache, etc.), the non-volatile mass storage device is often a performance bottleneck. Known disk drives include a volatile cache (e.g., a DRAM cache, an SRAM cache), but such volatile caches are typically part of the disk drive's microcontroller's main memory address space and thereby byte addressed (and not block addressed). In view of the foregoing, it can be appreciated that a substantial need exists for methods and apparatus which can enhance computer system performance.

DETAILED DESCRIPTION

According to an embodiment of the present invention, cache coherency of a non-volatile cache that is coupled to a mass storage device is administered. The non-volatile cache can store data that is read from the mass storage device. The non-volatile cache can also store data written to the mass storage device and can operate in at least two-write modes, e.g., a write-back mode and a write-through mode.

When the non-volatile cache is operating in a write-back mode, data that has been read from the mass storage device and modified can be stored in the non-volatile cache along with an indication (e.g., a "dirty" bit) that the data stored in the non-volatile cache is a modified version of data that is stored on the mass storage device. When the non-volatile cache stores a modified version of data that is stored on the mass storage device, there is incoherency between the non-volatile cache and the mass storage device. When the modified version of the data is written to the mass storage device and retained in the non-volatile cache, there is coherency between the non-volatile cache and the mass storage device with respect to that data, and the modified indication (e.g., the "dirty" bit) stored with that data in the non-volatile cache can be cleared. When the non-volatile cache is operating in a write-through mode, modified data is that is written to the non-volatile cache is also written to the mass storage device to maintain coherency between the non-volatile cache and the mass storage device.

In an embodiment of the present invention, a cache coherency administrator can include a controller and a memory coupled to the controller. An input and a display can be coupled to the controller. The input can receive a cache coherency instruction, and the controller can send a cache write-through instruction. A non-volatile cache can receive the cache write-through instruction and switch from a write-back mode to a write-through mode. The non-volatile cache can then write all modified data entries to the mass storage device so that there is coherency between the non-volatile cache and the mass storage device.

Figure 1:
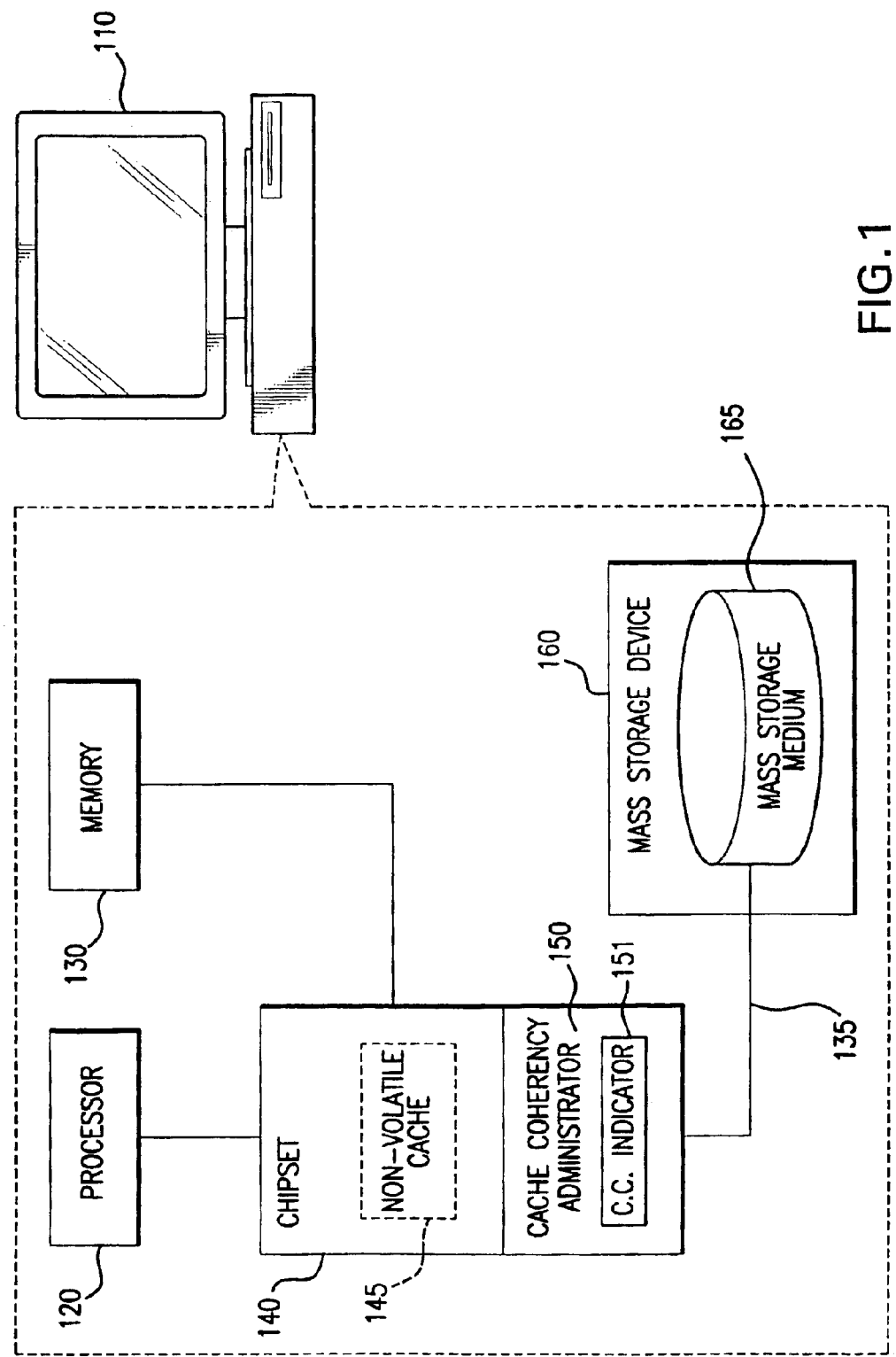
FIG. 1 shows an illustration a computer system in accordance with an embodiment of the present invention.

FIG. 1 shows an illustration a computer system ("computer") in accordance with an embodiment of the present invention. Computer 110 can include a processor 120 coupled to a memory 130 via chipset 140. The term "coupled" encompasses a direct connection, an indirect connection, a direct communication, an indirect communication, etc. Processor 120 can be, for example, a Pentium® III processor manufactured by Intel Corporation of Santa Clara, Calif., an application specific integrated circuit (ASIC), a microcontroller, etc. Memory 130 encompasses devices that store digital information such as DRAM, RDRAM, SRAM, read only memory (ROM), flash memory, etc. In another embodiment, a system bus can provide a communication path between the processor 120 and system components. The system bus can be a Peripheral Component Interconnect (PCI) bus, an Extended Industry Standard Architecture Bus (EISA), etc.

Processor 120 is also coupled to mass storage device 160 via chipset 140 and a communication path 135. In an embodiment, communication path 135 can be an Integrated Device Electronics (IDE) bus, an Enhanced IDE (EIDE) bus, an AT Attachment (ATA) bus, etc. In a further embodiment, the communication path 135 can be an expansion bus such as a small computer system interface (SCSI) bus, an IEEE 1394 bus, a Universal Serial Bus, etc.

Examples of mass storage device 160 include a hard disk drive, ZIP® drive, a Jaz® drive, a CD-RW drive, a DVD-RAM drive, an LS-120 Superdisk drive, a magnetic storage device, an optical storage device, a magneto-optical storage device, a holographic storage device, etc. An example of a hard drive is the Cheetah 18XL hard disk drive manufactured by Seagate Technology Inc. of Scotts Valley, Calif.

Mass storage device 160 can include a mass storage device controller and a mass storage medium 165. In an embodiment, a mass storage device controller can include a microcontroller, a memory, interface logic, and mass storage medium ECC (error control and checking) logic. In another embodiment of the present invention, mass storage device controller can include one or more ASICs implementing functions to operate mass storage device 160 (e.g., a first ASIC incorporating processor, memory and interface logic and a second ASIC implementing ECC logic, etc.). The mass storage device controller can control the operations of mass storage device 160 (e.g., the mass storage device controller memory can include read only memory that stores program instructions to initialize and operate mass storage device 160 upon power up, the mass storage device controller memory can store instructions to perform reads of data from mass storage device 160, the mass storage device controller memory can store instructions to control formatting of and/or writing data to mass storage device 160, etc.). The mass storage device controller memory can also include a buffer (e.g., a volatile memory buffer, etc.) that can temporarily hold data that is being written to and/or read from mass storage device 160.

The mass storage device controller can process requests from processor 120 to read data from, and/or write data to, mass storage device 160. In an embodiment, mass storage device 160 is a hard disk drive and the mass storage device controller can include interface logic such as IDE interface logic, EIDE interface logic, ATA interface logic, Fibre Channel interface logic, InfiniBand interface logic, SCSI interface logic, IEEE 1394 interface logic, USB interface logic, etc. In another embodiment, mass storage device 160 is a CD-RW drive or a DVD-RAM drive and the interface logic of the mass storage device controller can be ATA Packet Interface (ATAPI) logic. The term "logic" encompasses hardware, firmware, software, a combination thereof, etc.

In an embodiment, the mass storage device 160 is a hard disk drive, and the mass storage medium 165 includes one or more platters. Each platter can have one or more recordable surfaces, and each recordable surface can be written/read by a particular read/write head. Each surface can be divided into a plurality of tracks, and each track can be divided into a plurality of physical sectors. When a hard disk drive has a plurality of recordable surfaces, the collection of all the tracks at the same radial location on all recordable surfaces is called a cylinder. The location of each physical sector of a hard disk drive can be specified by a physical address specifying the cylinder, head (surface), and physical sector.

In an embodiment, when a processor requests data from a hard drive, the request does not specify the physical address of the data but rather the logical address of the data. Logical addresses of hard disk data can include logical sector addresses, logical block addresses, etc. When a hard disk drive is formatted, the hard disk drive controller of the hard disk drive can organize all of physical sectors into logical sectors (e.g., assigning each physical sector a logical sector address, etc.), and a mapping algorithm can map each logical sector address to a particular physical address. When read/write requests to a hard disk drive specify a logical sector address, the hard disk drive can be considered sector-oriented (i.e., sector addressable). A hard disk drive controller can also map collections of physical sectors into particular logical block addresses. When read/write requests to a hard disk drive specify a logical block address, the hard disk drive can be considered block-oriented (i.e., block addressable).

In an embodiment, chipset 140 is coupled to, and manages interaction between, the processor 120 and other system components, such as mass storage device 160 and peripheral components. The term chipset encompasses one or more integrated circuit chips ("integrated circuits") that acts as a hub (or core) for data transfer between the processor 120 and peripheral components. Examples of a chipset 140 include the 820 and 810E chipsets manufactured by Intel Corporation. Chipset 140 may be a single integrated circuit chip, a plurality of integrated circuit chips, etc. Chipset 140 may include a memory control hub (MCH), which can perform what is known as "northbridge functionality," and an input/output controller hub (ICH), which can perform what is known as "southbridge functionality."

Chipset 140 can include non-volatile cache 145. In another embodiment, non-volatile cache 145 is coupled to chipset 140. Non-volatile cache 145 can cache data that is typically stored on the mass storage medium 165 of mass storage device 160. Non-volatile cache 145 can cache data read from, and written to, mass storage device 160. Non-volatile cache 145 can have a faster access time as compared to the access time of mass storage device 160. Accordingly, data reads from, and data writes to, mass storage device 165 can be completed faster as compared to data read/writes to mass storage device 160. In an embodiment, data read/writes to non-volatile cache 145 require less power as compared to data read/writes to mass storage device 160. Write-back algorithms (i.e., write backs from the non-volatile cache 145 to the mass storage medium 165) can be implemented to increase system performance.

Non-volatile cache 145 can store a duplicate copy of frequently used mass storage device data and provide reduced access times for that frequently used data. In an embodiment, when data is read from mass storage device 160 and sent over communications path 135 via chipset 140, a copy of the data can be stored in non-volatile cache 145. When data is sent to mass storage device 160 via chipset 140 and communications path 135 to be stored, the data can be written to non-volatile cache 145 and later written to mass storage medium 165 according to a write-back algorithm. Because the non-volatile cache 145 is a non-volatile memory, the data saved in the non-volatile cache is typically not lost when the power (e.g., power to the mass storage device 160, power to the computer 110, etc.) is turned off. Non-volatile cache 145 can be any type of memory that can be read from/written to and retain its data when power external to the non-volatile cache 145 is removed or turned off.

Non-volatile cache 145 can be, for example, a flash memory, a battery backed-up DRAM, a battery backed-up SRAM, an atomic force probe memory, a magnetic RAM, a ferro-electric RAM, a holographic memory, etc. In an embodiment, read from non-volatile cache 145 can be destructive reads. Non-volatile cache 145 can be a block-oriented cache where data is accessed (e.g., written, read, etc.) in logical blocks. For example, when mass storage device 160 receives a data request (e.g., a data request to read data from mass storage device 160 onto communications path 135, a data request to write data to the mass storage device 160 from communications path 135, etc.), the data request can contain an address that is a logical block address, a logical sector address, etc. In an embodiment of the present invention, each of the data entries stored in non-volatile cache 145 corresponds to a logical address of mass storage medium 165.

In an embodiment in which mass storage device 160 is a hard disk drive, a non-volatile cache 145 can increase system perform because data reads/writes from the non-volatile cache 145 do not require the warm-up time incidental in writing/reading data from hard disk drive platters (e.g., spinning the platters up to operational speed, positioning read/write heads, etc.). For example, the time required for system boot-up of computer 110 can be reduced when boot-up information (e.g., operating system data, device drivers, application data, etc.) is read from a non-volatile cache 145 as opposed to hard disk drive platters. Keystroke/mouseclick latency experienced by a user of computer 110 can also be reduced.

In an embodiment, cache management instructions can manage data reads from/writes to non-volatile cache 145. The cache management instructions can be stored in memory 130, can be part of a mass storage device driver, etc. Cache management instructions can make decisions regarding what data can be cached, what data can be evicted from the cache, what data can be written back to the mass storage medium, when data write-backs occur, etc. Cache management instructions can also determine what data can be pre-fetched into the non-volatile cache 145. Cache management determinations, such as whether certain data should be cached in non-volatile cache 145, can be made using known cache management algorithms. For example, when a cache management algorithm determines that there is a low likelihood that the data read from mass storage device 160 will be read again in the near future (e.g., the data is part of an MP3 audio file, part of a WAV file, part of an AVI file, part of a streaming data file, etc.), then the data need not be cached. In addition, when it becomes advantageous to write data from non-volatile cache 145 to mass storage medium 165, cache management instructions can determine which data to write back using, for example, a least recently used (LRU) algorithm, a random replacement algorithm, etc.

In an embodiment, a mass storage device driver for the mass storage device 160 can appear to an operating system executing on computer 110 as if it were a typical mass storage device driver (e.g., ATAPI.SYS in a WIN98 environment, etc.) even though it has cache management instructions. In such an embodiment, the existence of non-volatile cache can be transparent to the operating system. In a further embodiment, the cache management instructions can be part of the operating system. In another embodiment, cache management can be performed by a combination of the operating system, the device driver for the mass storage device 160, and/or cache management logic of mass storage device controller of mass storage device 160.

In an embodiment of the present invention, data read from mass storage medium 165 can be processed by mass storage medium ECC logic of the mass storage device controller, and data read from non-volatile cache 145 can be processed by non-volatile cache ECC logic coupled to non-volatile cache 145. Each of mass storage medium ECC logic and non-volatile cache ECC logic can detect errors at the bit or multi-bit level and correct the errors as the data is being read.

Figure 5:
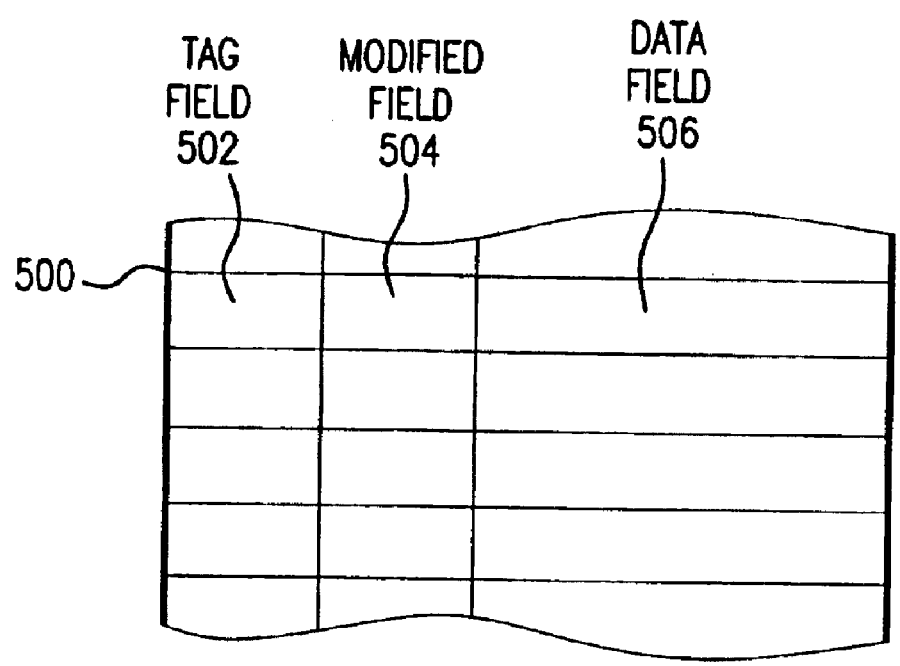
FIG. 5 shows an illustration of the organization of a non-volatile cache in accordance with an embodiment of the present invention.

FIG. 5 shows an illustration of the organization of a non-volatile cache in accordance with an embodiment of the present invention. A non-volatile cache 500 (e.g., non-volatile cache 145 of FIG. 1) can store a plurality of cache entries, and each cache entry can include a tag field 502, a modified field 504, and data field 506 that stores a data entry. In an embodiment in which the mass storage device is a hard disk drive, data field 506 can contain a disk sector of data (e.g., 512 bytes), a logical block of data, etc. The non-volatile cache can be organized and accessed via index/tag information, where tag field 502 can store the tag of each cache entry. In an embodiment, the index/tag information for each data entry in a cache entry of non-volatile cache 500 can be based on the logical address of the data entry.

Modified field 504 can be set to "modified" when the data of a cache entry is not identical to the data stored in the corresponding location on the mass storage medium of the mass storage device. For example, and referring to FIGS. 1 and 5, when data corresponding to a logical address of the mass storage device 160 is stored in the non-volatile cache 145, and that data was modified after having been read from the mass storage device 160, then the modified field 504 for the non-volatile cache entry can be set to "modified" to indicate that the copy of the data corresponding to that logical address stored in the non-volatile cache is different than the data corresponding to that logical address stored on the mass storage device 160. Modified field 504 can be referred to as a "dirty bit."

In another embodiment of the present invention, non-volatile cache 500 can include a cache directory table (i.e., cache directory) having a plurality of table entries. The cache directory can be accessed to determine whether a specific set of data of a mass storage device (e.g., a disk sector of a hard disk drive, a logical block of a hard disk drive, etc.) is present in the non-volatile cache 500. In an embodiment, the directory table can store an address (e.g., a logical sector address, a logic block address, etc.) of the data entry of the cache entry. To determine whether a specific set of data of a mass storage device is present in a non-volatile cache, the cache directory table can be searched using, for example, a known search algorithm. Alternatively, the cache directory can be sorted using a hashing algorithm. In an embodiment where the mass storage device is a hard disk drive, the presence of a requested disk sector in a non-volatile cache can be confirmed by comparing the sector address of the requested disk against the sector addresses stored in the cache directory table. In an embodiment, a non-volatile cache can be a fully associative cache. In another embodiment, a non-volatile cache can be a set associative cache.

In an embodiment, each of the cache entries of non-volatile cache 500 corresponds to a logical block of a mass storage device. In another embodiment, each of the cache entries of non-volatile cache 500 of a mass storage device corresponds to a sector (e.g., a physical sector, a logical sector) of a mass storage device. In an embodiment that has 2,000,000 cache entries in a non-volatile cache 500, there are 2,000,000 table entries in the cache directory table. In an embodiment, each table entry of the cache directory table can be four bytes long, and the cache directory table can use eight megabytes of non-volatile memory. The size of a cache directory table can be reduced (and thus the speed of the average cache access increased) by including a block of multiple disk sectors in each cache entry.

In an embodiment, each cache entry of non-volatile cache 500 can have a valid field, an address field, and an ECC field. The valid field can be set to "valid" (e.g., one of a logical one and a logical zero, etc.) when a cache entry contains valid data and may be set to "invalid" (e.g., the other of a logical one and a logical zero, etc.) when the cache entry does not contain valid data. For example, when data is evicted from the non-volatile cache to allow other data to be cached in the non-volatile cache, the valid fields of the evicted data entries can be changed from "valid" to "invalid" to signify that such cache entries no longer store cached data. An address field can contain the address (e.g., logical address, physical address) for the data stored in the cache entry. In an embodiment in which the mass storage device is a hard disk drive, the address field can store the sector address and can be referred to as a "sector identifier." In such an embodiment where logical blocks of data are cached in the non-volatile cache (e.g., each logical block corresponding to a plurality of sectors), the address field can contain the starting sector address of the logical block where each logical block has a known fixed size. An ECC field can stores error correcting codes for the data of the cache entry of non-volatile cache 500. In an embodiment, each logical block of data is associated with an error correcting code.

In an embodiment of the present invention, the non-volatile cache 145 can also store data written to the mass storage device 160 and can operate in at least two-write modes, e.g., a write-back mode and a write-through mode. When the non-volatile cache 145 is operating in a write-back mode, data that has been read from the mass storage device 160 and modified can be stored in the non-volatile cache 145 along with an indication (e.g., a "dirty" bit) that the data stored in the non-volatile cache 145 is a modified version of data that is stored on the mass storage device 160. When the non-volatile cache 145 stores a modified version of data that is stored on the mass storage device 160, there is incoherency between the non-volatile cache 145 and the mass storage device 160. If the mass storage device 160 was removed from computer system 110 (e.g., to move the mass storage device to another computer system) while there is incoherency between the non-volatile cache 145 and the mass storage device 160, the mass storage device 160 does not contain a coherent (e.g., complete) set of data because modified data is stored in the non-volatile cache 145 that has not been written through to the mass storage device 160.

In accordance with an embodiment of the present invention, chipset 140 can include a cache coherency administrator 150. In another embodiment, cache coherency administrator 150 can be coupled to chipset 140. Chipset coherency administrator 150 can receive a signal (e.g., a cache coherency signal, a cache incoherency signal, etc.) from non-volatile cache 145 indicating whether or not non-volatile cache 145 stores modified data. The cache coherency administrator 150 can modify the cache coherency indicator 151 based at least in part on the received signal. In one embodiment, the cache coherency administrator 151 can include an ASIC that receives the signal and sends a second signal to the cache coherency indicator 151. In another embodiment, the cache coherency administrator 151 can include an ASIC that sends a query signal to the non-volatile cache 145, receives a reply signal from the non-volatile cache 145 and routes the reply signal to the cache coherency indicator 151.

The cache coherency indicator 151 can be a display (e.g., a light emitting diode, a bi-state LED, a Liquid Crystal Display). For example, an LED can indicate in one state of on and off that there is cache coherency (e.g., the non-volatile cache contains no modified data), and can indicate in the other state of on and off that there is cache incoherency (e.g., the non-volatile cache contain modified data). In another example, an LCD can display a message (e.g., "Cache Incoherency", "Cache Coherency", etc.) relating to cache coherency. The cache coherency administrator 150—by including a cache coherency indicator 151 relating to cache coherency between non-volatile cache 145 and mass storage device 160—can advantageously indicate the cache coherency status of non-volatile cache 145, whether it is disadvantageous to remove mass storage device 160 from computer system 110, etc.

Figure 2:
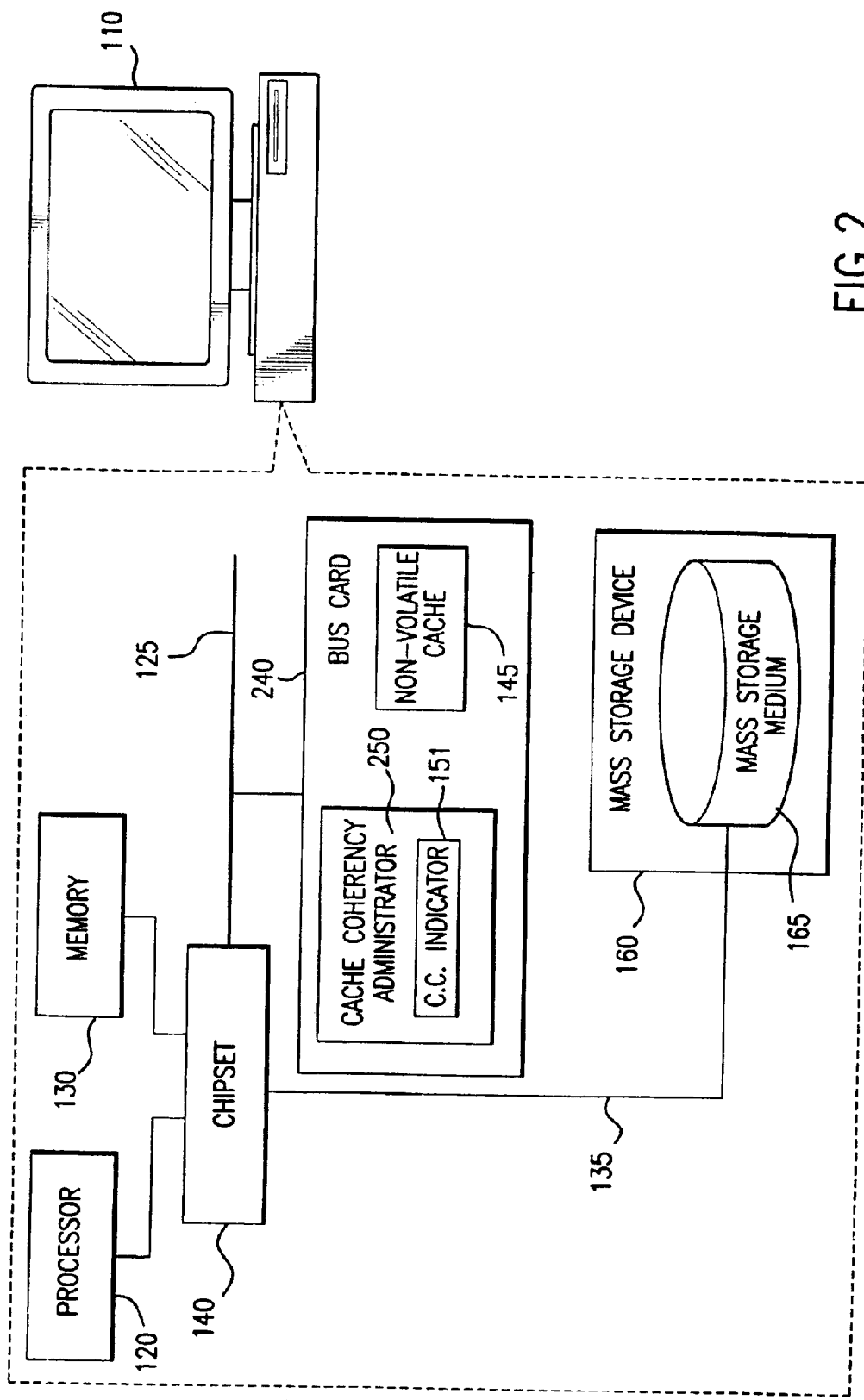
FIG. 2 shows a system in accordance with an embodiment of the present invention.

FIG. 2 shows a system in accordance with an embodiment of the present invention. In the system illustrated in FIG. 2, the non-volatile cache 145 is part of a bus card 240. The chipset 140 can be coupled to bus card 240 via bus 125. Examples of a bus card 240 include an add-in PCI bus card, an add-in ISA bus card, an add-in EISA bus card, etc. Additional examples of bus card 240 include cards that are coupled to processor 120 via an expansion bus such as a USB card, a SCSI card, an IEEE 1394 card.

In an embodiment, bus card 240 is a printed circuit board including non-volatile cache 145. Bus card 240 can include bus interface logic, non-volatile cache interface logic, a buffer, and other components for communications to and from non-volatile cache 145. In an embodiment, bus card 240 includes an edge connector that can be plugged in to an expansion slot in the backplane of a computer system 110. In an embodiment in which bus card 240 is coupled to processor 120 via an expansion bus, the bus card 240 can include an expansion bus port to be coupled to the expansion bus.

In an embodiment, a mass storage device driver includes non-volatile cache management instructions to manage data caching between non-volatile cache 145 and mass storage device 160. In accordance with an embodiment of the present invention, cache coherency administrator 250 can receive a signal (e.g., a cache coherency signal, a cache incoherency signal, etc.) from non-volatile cache 145 indicating whether or not non-volatile cache 145 stores modified data. The cache coherency administrator 250 can modify the cache coherency indicator 151 based at least in part on the received signal. The cache coherency administrator 250—by including a cache coherency indicator 151 relating to cache coherency between non-volatile cache 145 and mass storage device 160—can advantageously indicate the cache coherency status of non-volatile cache 145, whether it is disadvantageous to remove mass storage device 160 from computer system 110, etc.

Figure 3:
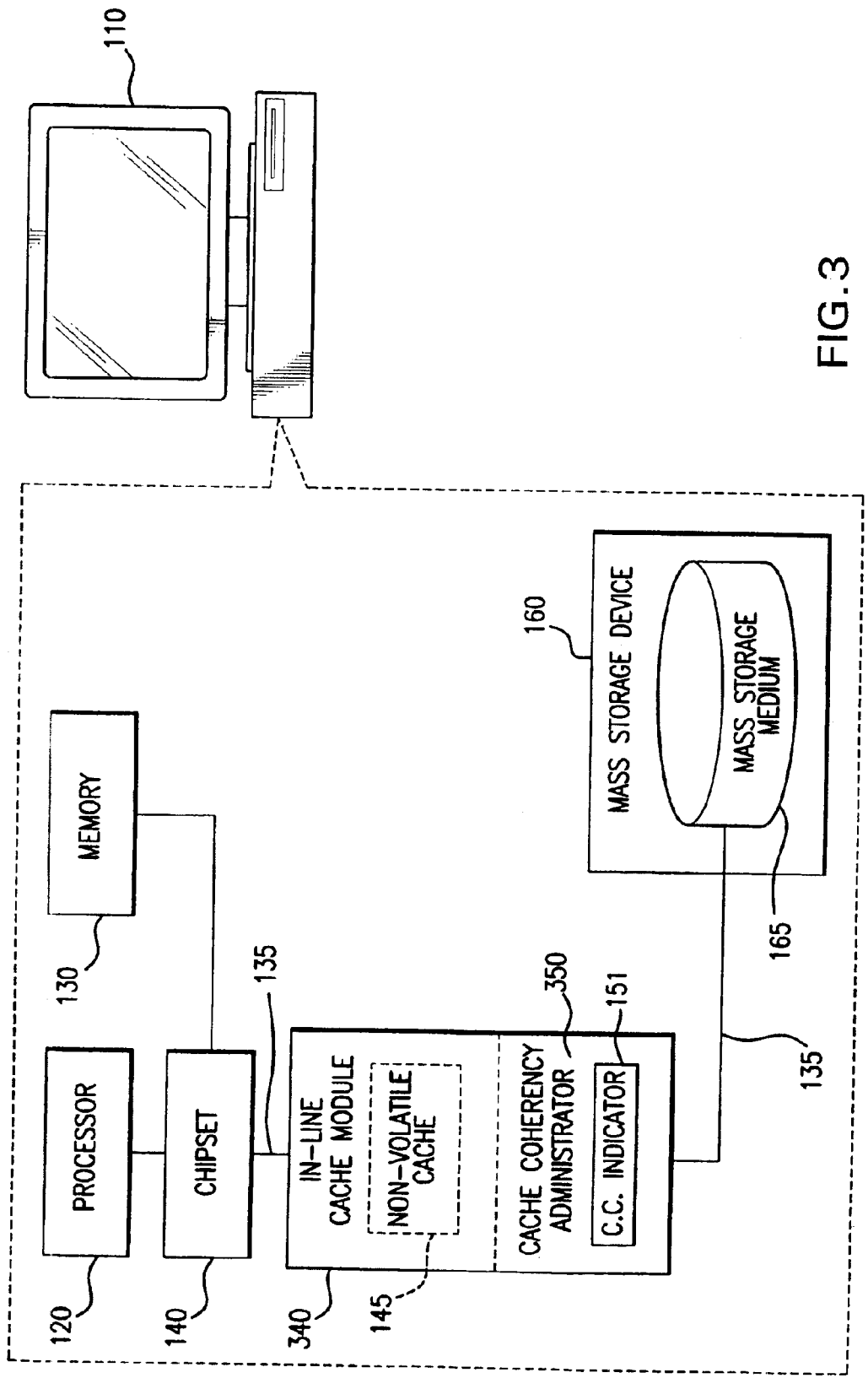
FIG. 3 shows a system in accordance with an embodiment of the present invention.

FIG. 3 shows a system in accordance with an embodiment of the present invention. In the system illustrated in FIG. 3, the non-volatile cache 145 is part of an in-line cache module 340. In an embodiment, in-line cache module 340 is coupled to processor 120 via chipset 140 and communications path 135. In-line cache module 340 also can be coupled to mass storage device 160 via communications path 135. In-line cache module 340 can include communications path 135 interface logic, non-volatile cache interface logic, a buffer, and other components for communications between non-volatile cache 145 and processor 120 and communications between non-volatile cache 145 and mass storage device 160.

In an embodiment, a-mass storage device driver includes non-volatile cache management instructions to manage data caching between non-volatile cache 145 and mass storage device 160. In accordance with an embodiment of the present invention, cache coherency administrator 350 can receive a signal (e.g., a cache coherency signal, a cache incoherency signal, etc.) from non-volatile cache 145 indicating whether or not non-volatile cache 145 stores modified data. The cache coherency administrator 350 can modify the cache coherency indicator 151 based at least in part on the received signal. The cache coherency administrator 350—by including a cache coherency indicator 151 relating to cache coherency between non-volatile cache 145 and mass storage device 160—can advantageously indicate the cache coherency status of non-volatile cache 145, whether it is disadvantageous to remove mass storage device 160 from computer system 110, etc. In an embodiment, cache coherency administrator 350 can be included within in-line cache module 340 and coupled to non-volatile cache 145.

Figure 4:
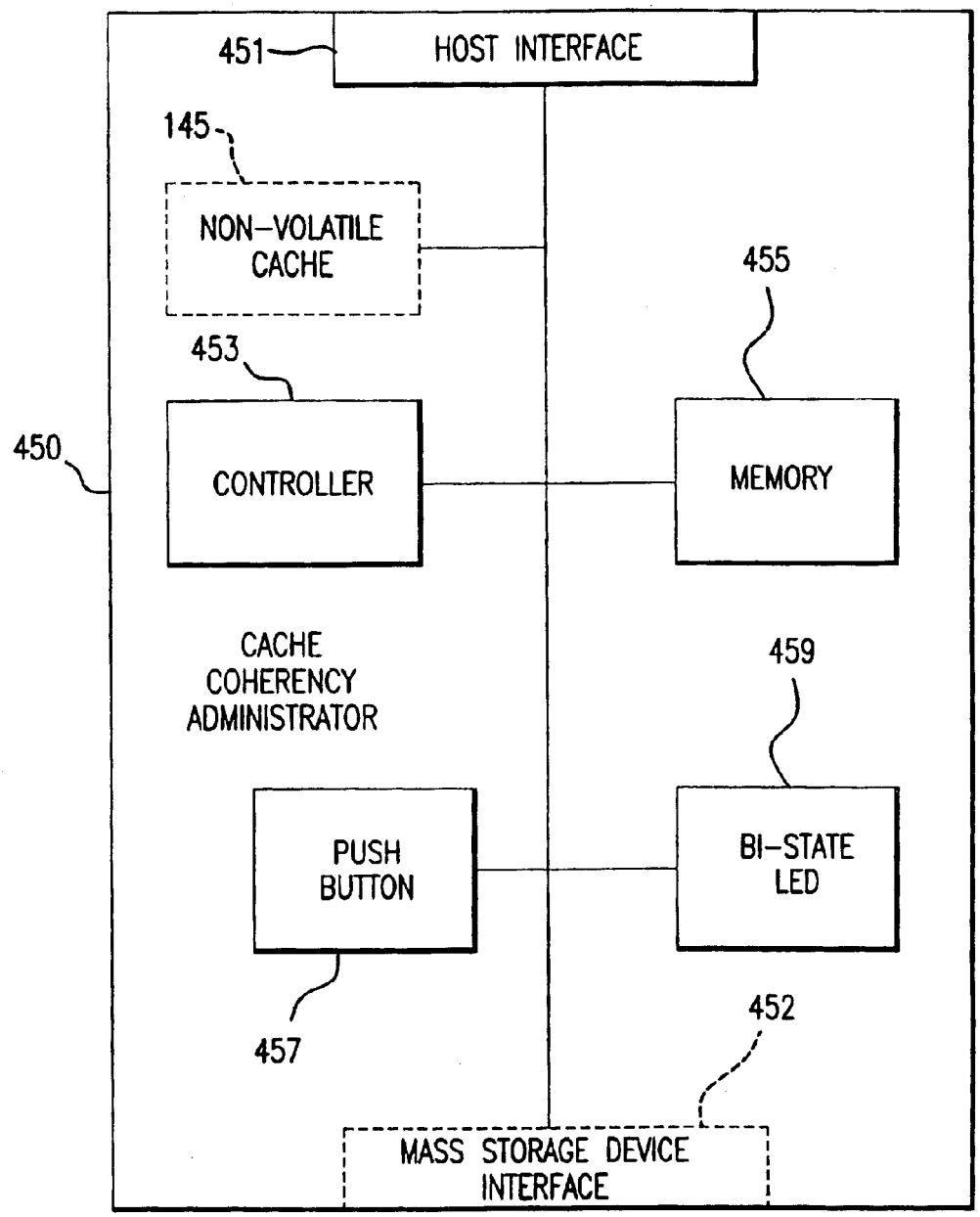
FIG. 4 shows an apparatus in accordance with an embodiment of the present invention.

FIG. 4 shows an apparatus in accordance with an embodiment of the present invention. A cache coherency administrator 450 can include a controller 453 (e.g., a processor, a microcontroller, etc.) coupled to a memory 455. Controller 453 can execute instructions stored on memory 455, and memory 455 can be a RAM, a ROM, or other device that can store digital information. In an embodiment, cache coherency administrator 450 can include an input device such as pushbutton 457 and an output device such as bi-state LED 459, each of which can be coupled to controller 453. Cache coherency administrator 450 can be coupled to a processor of a host system (e.g., a computer system) via host interface 451. Host interface 451 can be an ATA interface, a SCSI interface, a USB interface, an IEEE 1394 interface, etc. Mass storage device interface 452 can couple cache coherency administrator 450 to a mass storage device. Mass storage device interface 452 can be an ATA interface, a SCSI interface, a USB interface, an IEEE 1394 interface, etc. In an embodiment in which a cache coherency administrator is integrated with a non-volatile cache, cache coherency administrator 450 can include a non-volatile cache 145.

Cache coherency administrator 450 can display a cache coherency indicator via a display such as bi-state LED 459. In accordance with an embodiment of the present invention, cache coherency administrator 450 can receive a signal (e.g., a cache coherency signal, a cache incoherency signal, etc.) from a non-volatile cache coupled to a mass storage device indicating whether or not the non-volatile cache caches modified data as compared to the mass storage device. The cache coherency administrator 450 can modify the bi-state LED 459 based at least in part on the received signal. The cache coherency administrator 450—by including a display such as bi-state LED 459 relating to cache coherency of a non-volatile cache that caches data stored on a mass storage device—can advantageously indicate the cache coherency status of the non-volatile cache, whether it is disadvantageous to decouple the mass storage device from the non-volatile cache, etc.

For example, cache coherency administrator 450 can receive a signal indicating that there is cache incoherency between a non-volatile cache coupled to cache coherency administrator 450 and a mass storage device coupled to the cache coherency administrator 450. The signal can be in response to a query initiated by controller 453. In another embodiment, the non-volatile cache can signal to the controller 453 when it caches modified data. The cache coherency administrator can cause the bi-state LED 459 to display a first color (e.g., red) indicating that there is cache incoherency. A user can depress an input such as push button 457 to administer establishing and indicating cache coherency between the non-volatile cache and the mass storage device. In an embodiment, the controller 453 can send an instruction to the non-volatile cache to disable write-back caching and enter a write-through mode where each modified data entry stored in the non-volatile cache is written to the mass storage device. In an embodiment, the controller 453 can send an instruction to flush the non-volatile cache. After the non-volatile cache no longer stores any modified data, the controller 453 can receive a signal indicating that there is cache coherency between the non-volatile cache and the mass storage device. The cache coherency administrator 450 then, based at least in part on the cache coherency signal, can cause the bi-state LED 459 to display a second color (e.g., green) indicating that there is cache coherency. A user observing a cache coherency indicator on a display such as bi-state LED 459 can understand that it is safe from a data coherency standpoint to remove the mass storage device from a host system including the mass storage device and the non-volatile cache. The cache coherency administrator 450 can include appropriate labeling information to explain to a user the cache coherency status and steps to be taken so that the mass storage device can be removed without a data loss.

In an embodiment, after the non-volatile cache 145 receives a signal to enter the write-through mode, it will continue in the write-though mode until it receives a signal from controller 453 indicating that the non-volatile cache should change to write-back mode. In further embodiment, the signal that is sent by controller 453 signaling a change back to write-back mode is based upon an external input. In one embodiment, controller 453 will send a signal to change to write back mode when it receives an indication that the cache has been decoupled and recoupled from a disk drive or when it receives an indication that external power has been removed and restored to the cache. In another embodiment, push button 457 is a toggle switch, and controller 453 will send a signal to change to write back mode when it receives an indication that push button 457 has been toggle to a write-back position from a write-though position. In a still further embodiment, coherency administrator 450 includes a second push button or other input device that may be depressed by a user to indicate that the cache should be returned to write back mode. Other systems for returning the cache to write-back mode may also be used.

Figure 6:
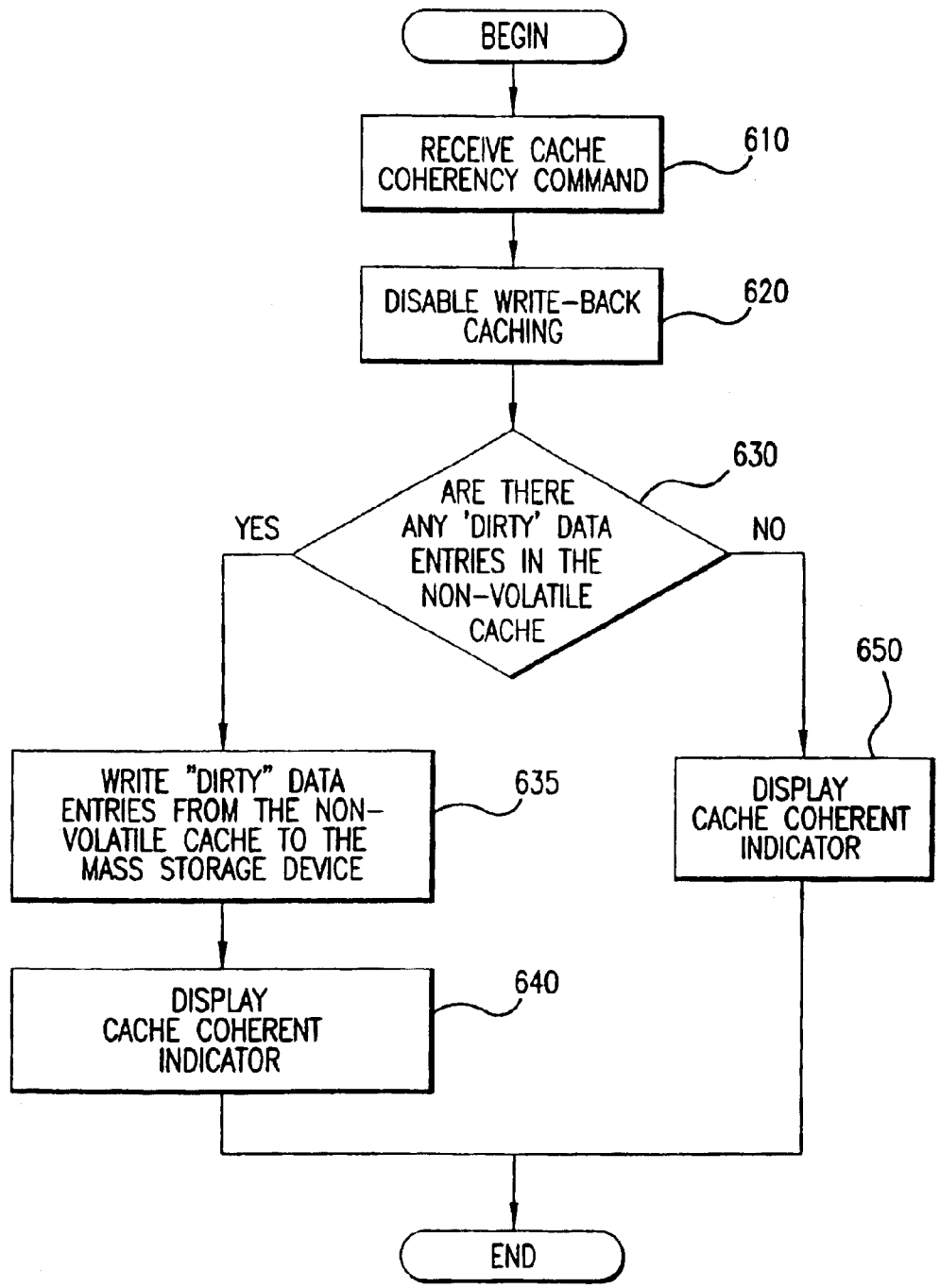
FIG. 6 shows a method in accordance with an embodiment of the present invention.

FIG. 6 shows a method in accordance with an embodiment of the present invention. In an embodiment of the present invention, an in-line cache module includes a cache coherency administrator. A cache coherency command can be received (box 610), e.g., generated at least in part in response to a displayed cache incoherency indicator. In response to the received cache coherency command, write-back caching to the non-volatile cache can be disabled (box 620). Whether there are any "dirty" data (i.e., modified data) present in the non-volatile cache can be determined (box 630). When there is no "dirty" data in the non-volatile cache, a cache coherent indicator can be displayed (box 650). When there is "dirty" data present in the cache, the "dirty" data entries can be written from the non-volatile cache to the mass storage device (box 635) and a cache coherent indicator can be displayed (box 640).

In accordance with an embodiment of the present invention, instructions adapted to be executed by a processor (e.g., controller) to perform a method are stored on a computer-readable medium. The computer-readable medium can be a device that stores digital information. For example, a computer-readable medium includes a ROM as is known in the art for storing software, firmware (e.g., microcode), etc. The computer-readable medium can be accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Methods and apparatus in accordance with embodiments of the present invention can advantageously indicate whether there is cache coherency between a mass storage device and a non-volatile cache that is caching mass storage device data. When cache coherency is indicated, a mass storage device can be decoupled from the non-volatile cache without data loss due to cache incoherency. In an embodiment of the present invention, a cache coherency administrator can receive a cache coherency command, direct writing of modified data from a non-volatile cache to the mass storage device, and then display a cache coherency indicator.

Embodiments of methods and apparatus to administer cache coherency between a non-volatile cache and mass storage device have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A controller to determine if there is coherency between a mass-storage device and a cache, wherein the controller is to flush the cache and operate the cache in a write-through mode based on receipt of an indication that the mass-storage device or the cache is to be physically disconnected from the system, and wherein the controller is to change the cache from write-through mode to write-back mode based on the cache having been physically reconnected to a mass-storage device.

2. The controller of claim 1, wherein the controller is coupled to a display to provide an indication to a user whether it is safe from a data-coherency standpoint to physically disconnect the mass-storage device or the cache from the system.

3. The controller of claim 1, wherein the cache is a non-volatile cache.

4. The controller of claim 3, wherein the non-volatile cache is a ferro-electric RAM.

5. The controller of claim 1, wherein the display is selected from the group consisting of a light emitting diode, a bi-state light emitting diode, and a liquid crystal display.

6. The controller of claim 1, wherein the apparatus further comprises an input to receive an indication from a user that the system should be made safe from a data-coherency standpoint to physically disconnect the mass-storage device or the cache from the system.

7. A system comprising:

a mass-storage device;

a non-volatile cache;

a controller to determine if there is coherency between the mass-storage device and the cache, wherein the controller is to flush the cache and operate the cache in a write-through mode based on receipt of an indication that the mass-storage device or the cache is to be physically disconnected from the system.

8. The system of claim 7, wherein the system further comprises a display coupled to the controller to provide an indication to a user whether it is safe from a data-coherency standpoint to physically disconnect the mass-storage device or the cache from the system.

9. The system of claim 8, wherein the cache is a non-volatile cache.

10. The system of claim 9, wherein the non-volatile cache is a ferro-electric RAM.

11. The system of claim 7, wherein the display is selected from the group consisting of a light emitting diode, a bi-state light emitting diode, and a liquid crystal display.

12. The system of claim 7, wherein the apparatus further comprises an input to receive an indication from a user that the system should be made safe from a data-coherency standpoint to physically disconnect the mass-storage device or the cache from the system.

13. A method of administering coherency in a system with a mass-storage device and a cache, the method comprising:

receiving an indication from a user that the system should be made safe from a data-coherency standpoint to physically disconnect the mass-storage device or the cache from the system;

flushing the cache and changing the cache to a write-through mode based on receipt of said indication that the system should be made safe from a data-coherency standpoint to physically disconnect the mass-storage device or the cache from the system;

determining that the cache has been physically reconnected to a mass-storage device; and changing the cache from write-through mode to write-back mode based on the cache having been physically reconnected to the mass-storage device.

14. The method of claim 13, wherein the method further comprises displaying an indication that it is safe from a data-coherency standpoint to physically disconnect the mass-storage device or the cache from the system.

15. The method of claim 13, wherein the indication is displayed using one of a light emitting diode, a bi-state light emitting diode, or a liquid crystal display.

16. The apparatus of claim 13, wherein the cache is a ferro-electric RAM.

* * * * *